(12) United States Patent
James (10) Patent No.: US 8,190,602 B1
(45) Date of Patent: May 29, 2012

(54) SEARCHING A DATABASE OF SELECTED AND ASSOCIATED RESOURCES

(75) Inventor: Barnaby James, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 412 days.

(21) Appl. No.: 11/699,646

(22) Filed: Jan. 30, 2007

(51) Int. Cl.
*G06F 7/00* (2006.01)
*G06F 17/30* (2006.01)

(52) U.S. Cl. .................................. 707/726; 707/748
(58) Field of Classification Search ....... 707/100–104.1, 707/709, 711, 708, 728, 748, 726
See application file for complete search history.

(56) References Cited

U.S. PATENT DOCUMENTS

| | | | | |
|---|---|---|---|---|
| 5,963,940 A | * | 10/1999 | Liddy et al. ........................... 1/1 |
| 5,999,912 A | * | 12/1999 | Wodarz et al. ............. 705/14.61 |
| 6,175,830 B1 | * | 1/2001 | Maynard ................................. 1/1 |
| 6,484,166 B1 | * | 11/2002 | Maynard ........................ 707/694 |
| 6,519,600 B1 | * | 2/2003 | Siefert ............................ 707/10 |
| 6,980,984 B1 | * | 12/2005 | Huffman et al. ....................... 1/1 |
| 2001/0049688 A1 | * | 12/2001 | Fratkina et al. ............. 707/104.1 |
| 2003/0217113 A1 | * | 11/2003 | Katz et al. ..................... 709/213 |
| 2006/0026067 A1 | * | 2/2006 | Nicholas et al. ................ 705/14 |
| 2006/0242137 A1 | * | 10/2006 | Shah et al. ........................ 707/4 |
| 2007/0185858 A1 | * | 8/2007 | Lu et al. ............................ 707/5 |
| 2008/0082486 A1 | * | 4/2008 | Lermant et al. ................... 707/3 |
| 2009/0030905 A1 | * | 1/2009 | Morris .............................. 707/6 |

OTHER PUBLICATIONS

*Search, with a little help from your friends*, Jun. 28, 2005, <http://www.ysearchblog.com/archives/000130.html> (visited Feb. 27, 2007).
del.icio.us/help/tags, <http://del.icio.us/help/tags> (visited Feb. 27, 2007).
del.icio.us/about, <http://del.icio.us/about/> (visited Feb. 27, 2007).

* cited by examiner

*Primary Examiner* — Apu Mofiz
*Assistant Examiner* — Mohammad Rahman
(74) *Attorney, Agent, or Firm* — Robert C. Kowert; Meyertons, Hood, Kivlin, Kowert & Goetzel, P.C.

(57) ABSTRACT

Searching a database of selected and associated resources is described, including receiving a selected resource and adding the selected resource to a database, finding an associated resource associated to the selected resource, assigning a weight to the associated resource based on a relationship of the associated resource to the selected resource.

15 Claims, 8 Drawing Sheets

SEARCHING A DATABASE OF SELECTED AND ASSOCIATED RESOURCES

FIELD OF THE INVENTION

The present invention relates generally to software. More specifically, searching a database of selected and associated resources is described.

BACKGROUND OF THE INVENTION

A user can initiate a search of a database or collection of resources to locate or discover information about a variety of subjects. For example, a user can search the Internet using a search engine to find links (e.g., uniform resource locators or URLs) associated to a search query. The specific links that are returned by the search engine can be ordered based on a relevance score calculated by the search engine. The relevance score can be determined by comparing the search query to the content of the webpages and other resources in the collection.

The information in the webpages and other resources returned by the search may or may not be useful to the user. For example, a user can enter a search query that returns search results that have little relevance to the user's interpretation of the search query. Further, search queries can be ambiguous in nature. For example, if a user searches for an abbreviation, the search engine may return search results that relate to a more common or better known abbreviation that is different than what the user wanted.

Thus, what is needed is a search capability without the limitations of conventional techniques.

BRIEF DESCRIPTION OF THE DRAWINGS

Various examples are disclosed in the following detailed description and the accompanying drawings.

DETAILED DESCRIPTION

Various examples may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields associated to the examples has not been described in detail to avoid unnecessarily obscuring the description.

According to various examples, searching a database of selected and associated resources is described. A resource may be any source of information or a pointer to a source of information that may be stored in a database. For example, a resource may be a link such as a uniform resource locator (URL), a data file (e.g., a hypertext markup language (HTML) file, a text file, a word processing file, or an image), a pointer, or container of data or information. A database may be any data structure in which resources may be stored. For example, a database may include a file, group of files, volume, or other data container. A selected resource may be a resource that has been added to a database by a user, and an associated resource may be a resource that has some sort of connection or is somehow associated with (e.g., related to) a selected resource. For example, an associated resource may be within in a location near a selected resource (i.e., somewhere within the path of a selected resource), or may be mentioned a selected resource. According to various examples, a user may choose selected resources to add to a database. Associated resources may then be found based on the relationship of a resource to a selected resource, for example by finding resources within the path of the selected resource. A relationship between an associated resource and a selected resource may be any connection that may be drawn between the associated resource and the selected resource such as a nearby location or a reference of the associated resource by the selected resource. The associated resources may also be added to the database or to a separate database. A user may formulate a search query to search the database of selected resources and may also search the associated resources (which may be part of the database) to find information that the user has already located or information that is similar to that of the selected resources that the user has already identified. In some examples, the search may return search results including the selected and associated resources. In other examples, the order of the search results may be based on a relevance score returned by a search engine. Further, the order of the search results may further be modified by combining the relevance score of an associated resource with a weight of the associated resource that depends on the relationship (e.g., the proximity) of the associated resource to the selected resource.

According to other examples, the databases of selected and associated resources of a group of users may be aggregated so that an individual user may search the group's databases. For example, the group of users may be organized in a tree structure. A user may then generate a search query to search the selected resources of a selected portion of the group of users. For example, the search query may select a portion of the group that is located in a certain area or that has a certain job title.

A Search Space and Tagged Resources

Figure 1:
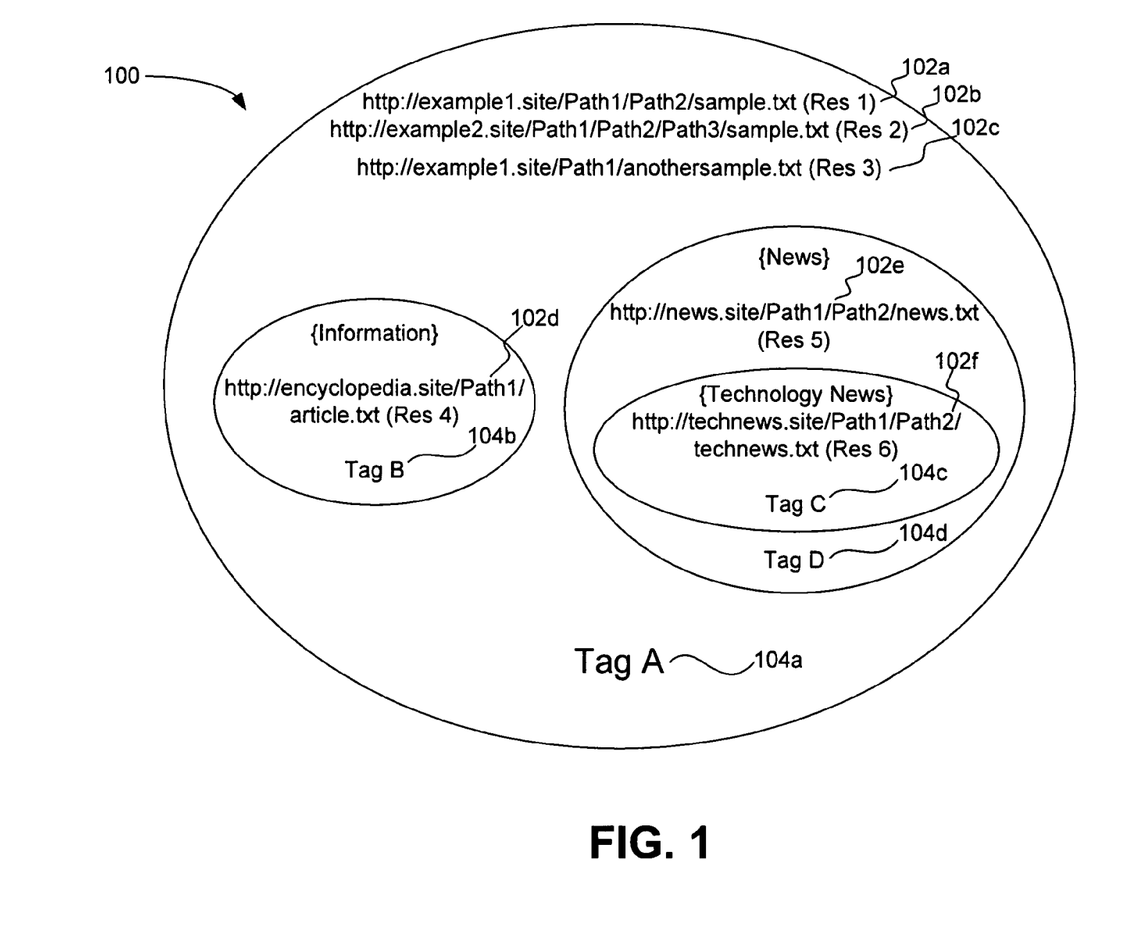
FIG. 1 illustrates tags and selected resources in a search space according to an example.
Figure 2:
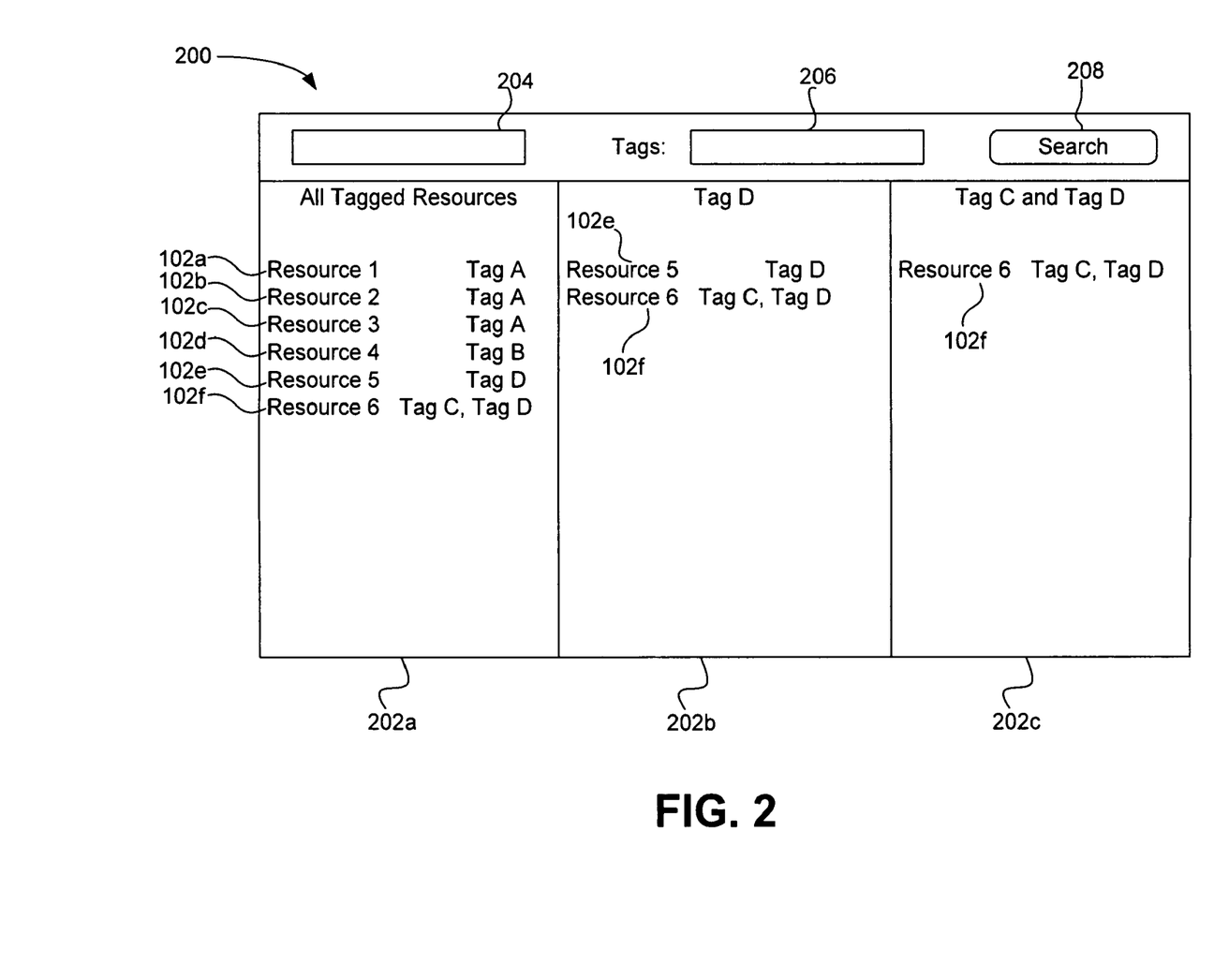
FIG. 2 illustrates searching selected resources using tags according to an example.

FIGS. 1 and 2 illustrate aggregating and searching selected resources according to various examples. FIG. 1 illustrates tags and selected resources in a search space according to an example. FIG. 2 illustrates searching selected resources using tags according to an example.

FIG. 1 illustrates a graphical representation of a search space 100. The search space 100 may illustrate a database of selected resources 102 using tags 104 that a user has defined. A tag may be a structure applied to a selected resource by a user to denote a category to which the selected resource belongs. For example, a user may add a selected resource to a database that makes up the search space 100, and apply one or more tags to the selected resource to approximately identify the content of the selected resource.

For example, as shown here, the tag A 104a is a general tag that applies to all of the selected resources 102 designated by the user. The tag B 104b is entitled "Information," and may include selected resources that have information (e.g., encyclopedia articles) for example the resource 102d that is a link to the file at the URL "http://encyclopedia.site/Path1/article.txt." A tag D 104d is entitled "News," and may identify selected resources that include news, for example the resource 102e that is a link to the page at the URL "http://news.site/Path1/Path2/news.txt." A tag C 104c is a subtag of the tag D 104d, and therefore a selected resource that has the tag C 104c also has the tag D 104d. A subtag may be a tag that designates a group of selected resources within another tag. For example, the tag C 104c is for technology news, a subcategory of news, and includes the selected resource 102f that is a link to a file at the URL "http://technews.site/Path1/Path2/technews.txt."

A user may search his selected resources and tags to find material and information that he has already viewed or selected, for example. This may allow a user to locate information that the user has already designated as useful or desirable. A user may specify a tag and a search query to search the search space 100. The search query may include one or more search parameters or terms, and the tag may specify one or more tags that the user wishes the search to look for. The search may be performed by a search engine that uses the search query to determine a relevance score for various search results (see, e.g., FIG. 4). According to various examples, the search results may be the selected resources 102. The selected resources 102 may also be searched by selecting tags without using a search query (see, e.g., FIG. 2).

FIG. 2 illustrates using tags to locate selected resources according to various examples. As shown here, the labels "Resource 1-6" are used in place of the full URLs for the selected resources 102a-102f, respectively, to maintain clarity of the figure. A search window 200 includes three search panes 202a, 202b, and 202c. According to an example, the pane 202a may be displayed first. The pane 202a shows all of the selected resources 102 (i.e., the resources that have the tag A 104a). A user may then select another tag to narrow the number of selected resources. For example, as shown here, the user selects the tag D 104d, and the pane 202b appears. The pane 202b shows the selected resources 102e and 102f that have the tag D 104d. The user may then select another tag, for example a subtag of the tag D 104d. As shown here, the user selects the tag C 104c, and the pane 202c appears, showing the selected resource 102f, which has both the tags C 104c and D 104d. The user has thus located the selected resources 102 having the tags C 104c and D 104d.

The search window 200 illustrates one way to use tags to locate resources that a user may have previously viewed or selected. According to other examples, a user may enter a search query (e.g., including a search term) into a text box 204, and may enter tags to search into a text box 206. The tags in the text box 206 may be names of tags, for example "news" or "information." The user may then search the database of selected resources by selecting a search button 208. The search may use a search engine to search the selected resources and return search results. For example, a user may search for a search query in the technology news tag C 104c, returning two selected resources 102e and 102f.

Various other search techniques or functionalities may be used with the examples described herein. For example, a user may formulate search query to search for tags that he may be interested in, and the search engine may return the tags as well as selected resources that have those tags. The appearance of the search window 200 may also vary depending on aesthetic and functional desires for certain applications.

Associated Resources

Figure 3:
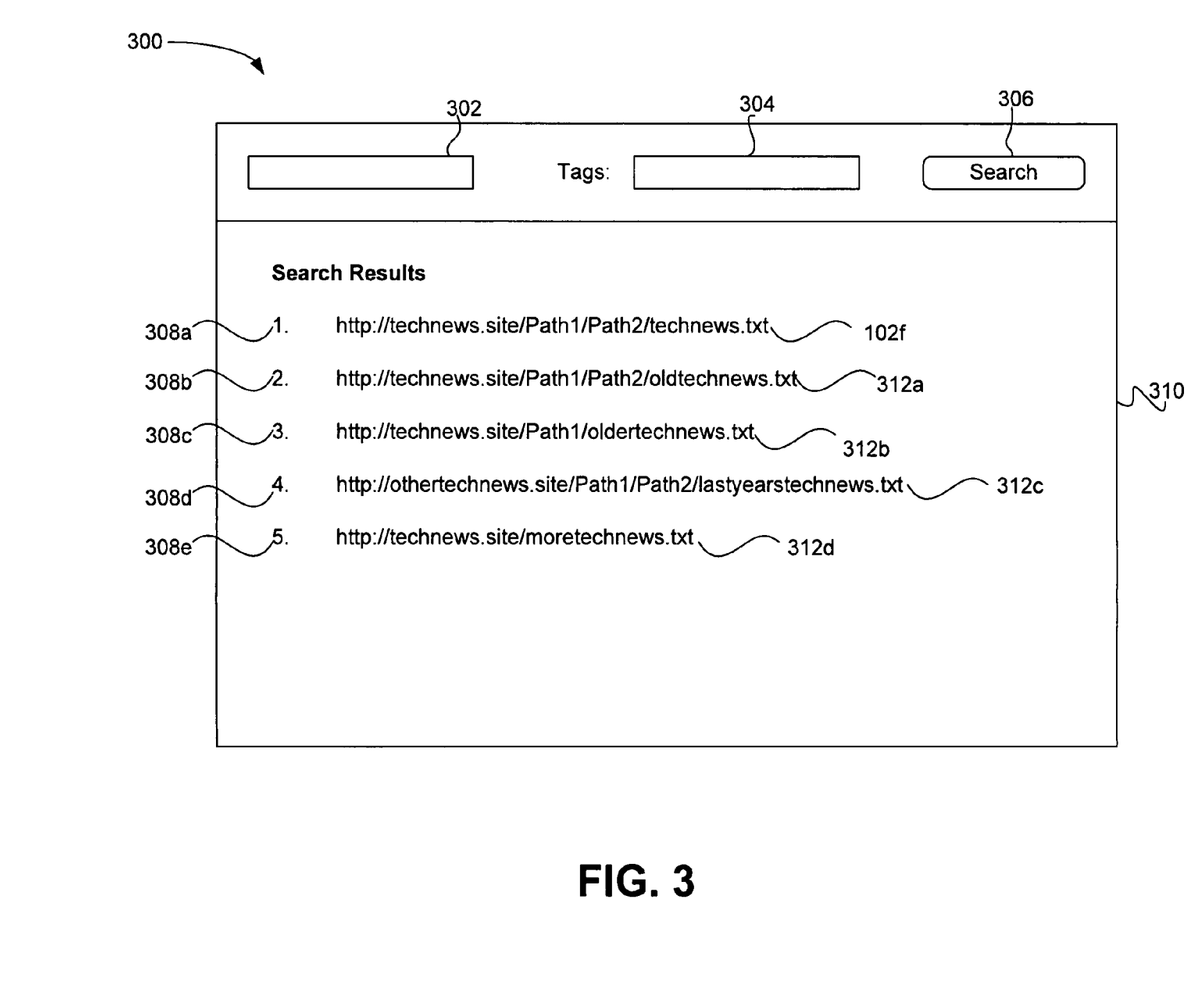
FIG. 3 illustrates a search window for searching selected resources and associated resources according to various examples.

FIG. 3 illustrates a search window 300 for searching selected resources and associated resources according to various examples. When a user searches his database of selected resources, the search results may also include associated resources. An associated resource may be, for example, a resource that is linked to (i.e., mentioned) in a selected resource, or may be a resource that is located within a certain proximity (e.g., within the same general path) as a selected resource. Other relationships between selected resources and associated resources may also be used. As shown here, a user may enter a search query into the text box 302 and tags into the text box 304. The user may initiate a search by selecting the search button 306.

When the user initiates a search, various search results 308 may be displayed in a search result pane 310. The search results 308 may be resources, such as URLs, and may include both selected resources (e.g., the selected resource 1020 and associated resources 312. For example, the search result 308a is the selected resource 102f. The search result 308b is an associated resource 312a, which is associated to the selected resource 102f by virtue of being in the same directory (i.e., having the same path) as the selected resource 102f. The search result 308c is an associated resource 312b, which is associated with the selected resource 102f; the associated resource 312b is within the path of the selected resource 102f separated by one path segment. The search result 308d may be an associated resource 312c found within the selected resource 102f. For example, the associated resource 312c may be a link listed in the text of the selected resource 102f. The search result 308e is an associated resource 312d that is found within the root of the selected resource 102f.

Each of the search results 308b-308e may be an associated resource that has a weight assigned to it based on its relationship to the selected resource 102f (i.e., the search result 308a). Various techniques may be used to determine the weight for an associated resource, several are described below. Once a weight for an associated resource has been determined, the weight may be combined with (e.g., multiplied with) a relevance score for the associated resource as determined by a search engine. The combined score may then be used to determine an order of the search results 308. For example, the weight assigned to an associated resource may be less than one, so that an associated resource having the same relevance score as a selected resource appears beneath the selected resource in the search results.

Determining a Weight for Associated Resources

Figure 4:
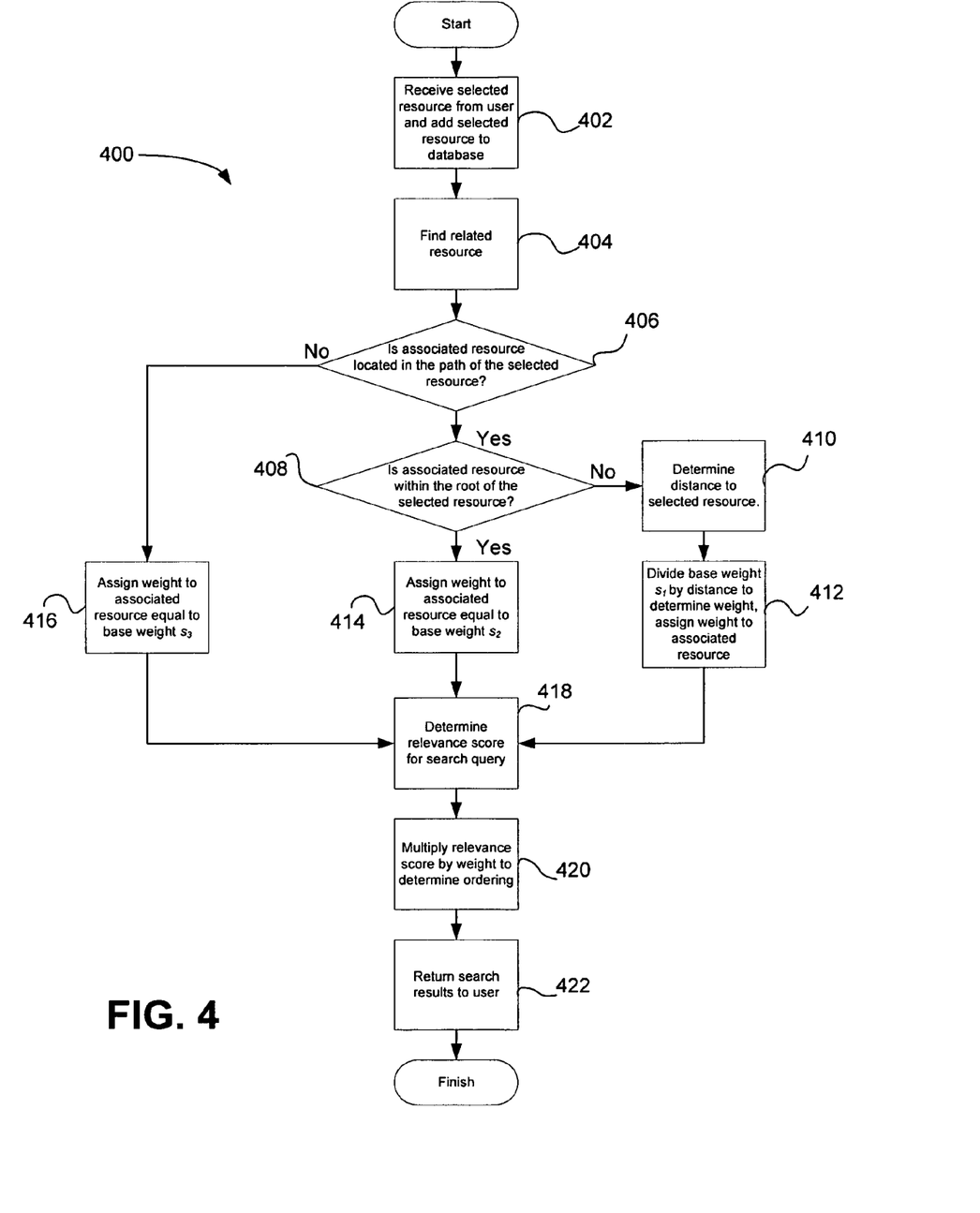
FIG. 4 is a flowchart describing a process for determining a weight for associated resources and determining an order of search results according to various examples.

FIG. 4 is a flowchart describing a process 400 for determining a weight for associated resources and determining an order of search results according to various examples. In describing the process 400, a weight for the associated resource 312b of the search result 308c is determined as an example. The weight may be used to determine an order of associated resources amongst a group of search results returned in response to a search query, for example.

In operation 402, a selected resource is received from a user an added to a database. A user, for example while viewing a webpage on the Internet, may add a link to that webpage to his database. The link is a selected resource for the user. The user may also add a tag to denote a category of the selected resource. In operation 404, an associated resource is found. The associated resource may be, for example, a resource within the path of the selected resource. The associated resource may also be added to the database, or added to another database. Finding associated resources is explained in more detail regarding FIG. 5.

In operation 406, it is determined whether the associated resource is located somewhere within the path of the selected resource. If the associated resource is within the path of the selected resource, the process continues to operation 408. For example, the associated resource 312b is within the path of the selected resource 102f. In operation 408, it is determined whether the associated resource is within the root of the selected resource. If the associated resource is not within the root of the selected resource, the process 400 continues to the operation 410. For example, the associated resource 312b is within the path of the selected resource 102f, but not within the root (i.e., within http://technews.site/) of the selected resource 102f. Thus, when determining the weight of the associated resource, the process 400 may proceed to the operation 410.

In operation 410, a distance of the associated resource from the selected resource is determined. The distance may be composed of one or more path segments. For example, the selected resource has a distance of zero path segments from itself, one path segment from files or pages in the same directory (e.g., in the directory Path2/), and two path segments from files or pages in the next directory up (e.g., in the directory Path1/). The associated resource 312b is therefore two path segments distant from the selected resource 102f.

According to various examples, base weights may be used in calculating the weight for an associated resource. According to an example, three arbitrary base weights: $s_1$, $s_2$, and $s_3$, may be used. The base weight $s_1$ may be used for associated resources located somewhere within the path of the selected resource. The base weight $s_2$ may be used for associated resources located within the root of the selected resource. The base weight $s_3$ may be used for associated resources that are linked to or mentioned by the selected resource. According to some examples, the base weight $s_1$ may have a greater value than the base weight $s_2$, which may again have a greater value than the base weight $s_3$. According to other examples, however, it may be determined that associated resources mentioned in the selected resource should have the most weight, and that the base weight $s_3$ may have a greater value than the base weight $s_1$. More or fewer base weights and categories of weight may be used according to various examples.

In operation 412, the distance of the associated resource from the selected resource is divided into a base weight for an associated resource within the path of the selected resource and the weight is assigned to the associated resource. For example, the base weight for an associated resource within the path of a selected resource could be given as an arbitrary value $s_1$. Using the associated resource 312b as an example, the weight assigned to the associated resource 312b is $s_1/2$, since the associated resource 312b is two path segments from the selected resource 102f.

If, in operation 408, it is determined that the associated resource is within the root of the selected resource, in operation 414 a weight of the associated resource may be assigned a base weight, such as an arbitrary value $s_2$, for associated resources within the root of selected resources. For example, the associated resource 312d is found within the root of the selected resource 102f. The associated resource 312d may then be assigned a weight equal to the base weight for associated resources in root directories, or $s_2$.

If, in operation 406, it is determined that the associated resource is not located within the path of the selected resource, the associated resource may be assigned another base weight, for example an arbitrary value $s_3$, in operation 416. For example, the associated resource may be a link resource within the selected resource, such a URL hyperlink. The associated resource 312d is an example of a URL hyperlink found within the selected resource 102f.

In operation 418, a relevance score for a search query is determined. The relevance score may be determined by entering a user's search query into a search engine that searches the selected resources 102 in the user's search space 100, for example. A relevance score may be a value generated by a search engine that quantifies the relative importance of a resource based on a search query. In operation 420, the relevance score may be multiplied by the weight for the associated resource to determine an order of search results. In operation 422, the search results are returned to the user, for example in the search results pane 310. The order of the search results may be based on the weighted relevance scores of the associated resources and the relevance scores assigned to the selected resources.

For example, the search engine may determine, based on the search query, that the selected resource 102f may have a relevance score of 0.8, while the associated resource 312a has a relevance score of 1.0. However, according to this example, the base weight $s_1$ may be equal to 0.5. The associated resource 312a is one path segment distant from the selected resource, so the weight of the associated resource 312a is 0.5/1=0.5. The weighted relevance score for the associated resource 312a is then 0.5, and the associated resource 312 appears below the selected resource 102f in the search results 308. The weights and relevance scores described here are examples; it is understood that these any values may be used.

Finding Associated Resources

Figure 5:
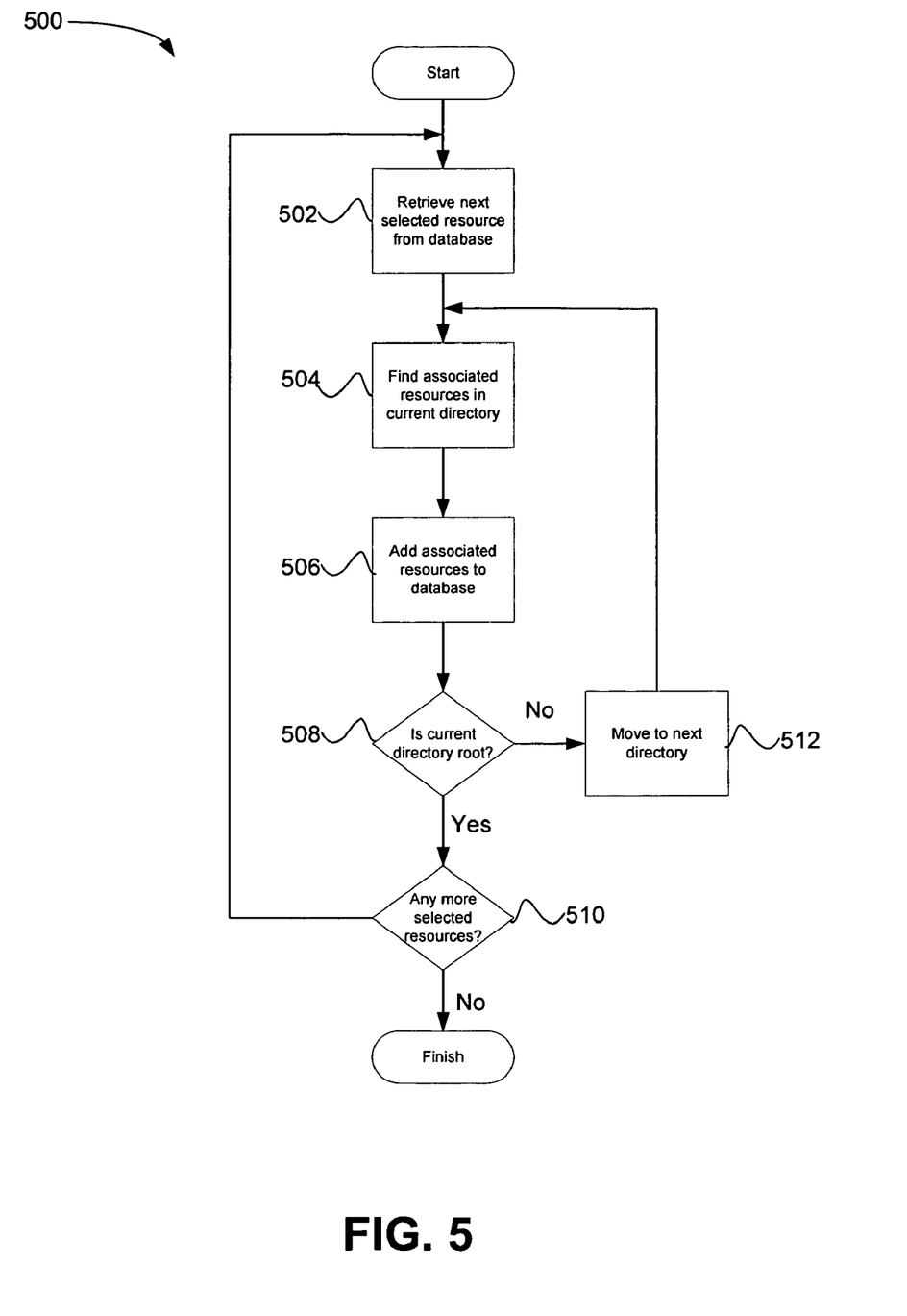
FIG. 5 is a flowchart describing a process for finding associated resources according to various examples.

FIG. 5 is a flowchart describing a process 500 for finding associated resources according to various examples. As described herein, an associated resource may be found in the path of a selected resource or may be referenced to by a selected resource. It is understood that an associated resource may have any relationship to a selected resource, such as having a same author or being from a same location.

In operation 502, the next selected resource is retrieved from the database. A current directory may be a directory within which the selected resource is located. The selected resource may be a URL, for example. In operation 504, associated resources within the current directory are found. For example, other files or pages within a directory including the selected resource may be determined to be associated resources. According to another example, associated resources may also be found within other directories within the current directory. The associated resources found may include every file or other data container within the directory or may include only certain files, such as HTML files or portable document format (PDF) files. In operation 506, these associated resources may be added to the database including the selected resources, or added to a separate database.

In operation 508, it is determined whether the current directory is the root directory of the selected resource. If the current directory is the root directory, in operation 510, it is determined whether there are more selected resources in the database. If there are more selected resources, the process 500 returns to operation 502, where the next selected resource is retrieved from the database. If there are no more selected resources, the process 500 finishes.

If the current directory is not the root directory, in operation 512, the next directory up is retrieved (e.g., Path1/), and the process 500 returns to operation 504, where associated resources in the directory are found. Although a directory structure is described here, it is understood that the process 500 may be used with any type of data storage structure.

Searching Selected Resources of a Group of Users

Figure 6:
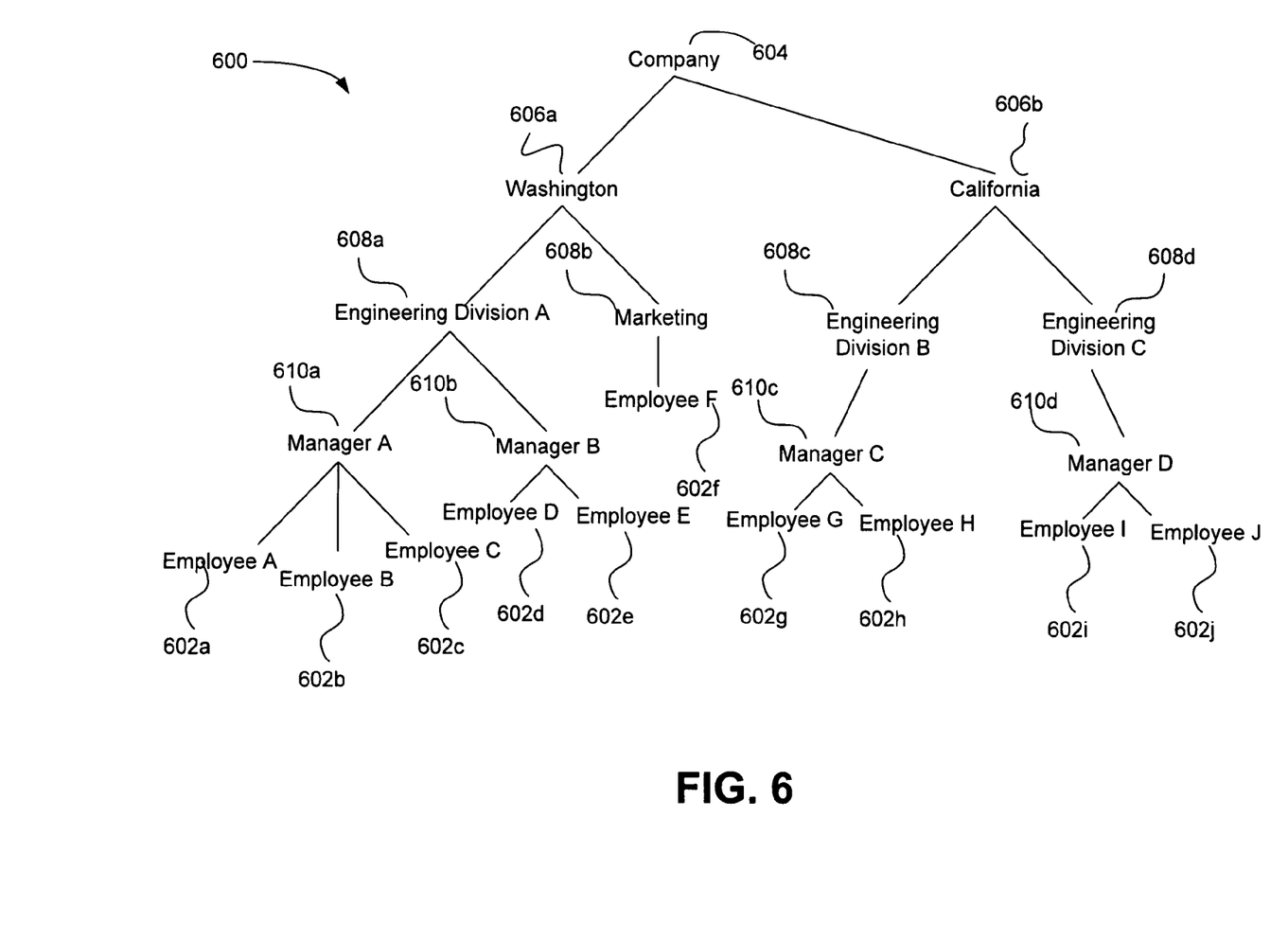
FIG. 6 is a tree structure showing a group of users according to various examples.

FIG. 6 is a tree structure 600 showing a group of users according to various examples. Individual users 602 of the group may each have a database including selected resources that define a search space such as the search space 100. A user 602 or other person may search the databases (i.e. search spaces) of others within the tree structure 600. For example, selected resources stored by users 602 of the group may include favorite restaurants, news websites, and useful technical information.

The tree structure 600 may be used to describe any organizational structure. For example, the tree structure 600 shown here may describe the organizational structure of a company 604. The company has two locations, Washington 606a and California 606b. Washington 606a has an engineering division A 608a, and a marketing division 608b, while California has an engineering division B 608c and an engineering division C 608d. The engineering division A 608a has two managers A 610a and B 610b. Manager A 610a manages the employees A, B, and C, who are the users 602a, 602b, and 602c. Manager B 610b manages the employees D and E, who are the users 602d and 602e. Marketing 608b has one employee 602f. The engineering division B 608c has one manager C 610c, who manages two employees G and H, the users 602g and 602h, respectively. The engineering division C 608d has one manager D 610d, who manages two employees I and J, the users 602i and 602j, respectively. The tree structure 600 is an example of an organizational chart. Various other types of organizational charts may also be used according to various examples.

Figure 7:
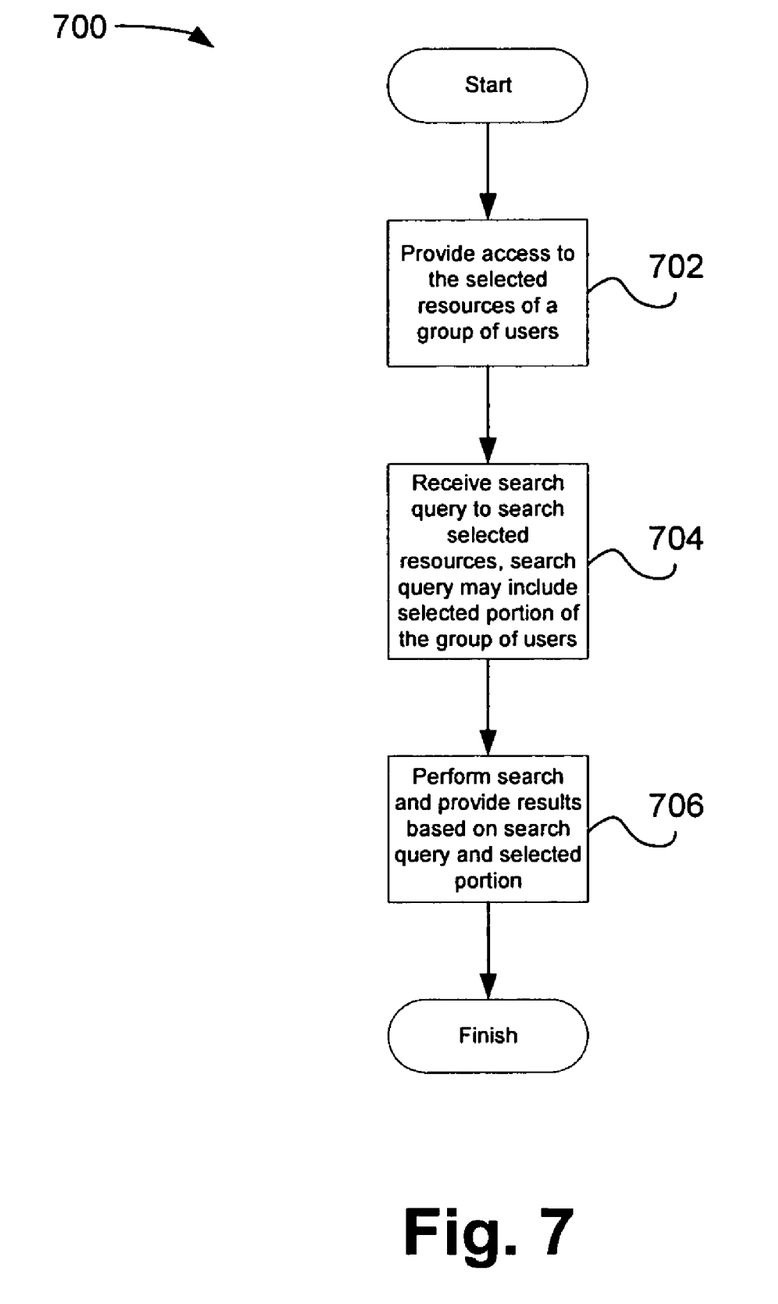
FIG. 7 is a flowchart describing a process for searching the selected resources of at least a portion of a group of users according to various examples.

FIG. 7 is a flowchart describing a process 700 for searching the selected resources of at least a portion of a group of users according to various examples. In operation 702, a user may be provided access to the selected resources of a group of users 602. The user may also be given access to the associated resources of the group of users. In operation 704, a search query to search the selected resources may be received. The search query may include a selected portion of the group of users to search. For example, a user may specify a portion of the tree structure 600 to search. As a further example, a user 602 may choose to search the selected resources of users in either Washington 606a or California 606b. A user 602 may also additionally or alternatively specify that he wants to search selected resources of users working for the same manager, for example Manager A 610a. The search query may also include any search parameter, and may be, for example, "Italian restaurant in San Jose."

In operation 706, a search is performed, and a search result is provided based on the search query and the portion of the selected resources belonging to the selected portion of the group of users. The search result may include various selected and associated resources that match the search query and that are included in the selected and associated resources belonging to the users within the portion of the tree structure 600 selected by the user performing the search. For example, the search may return search results indicating several Italian restaurants in the city of San Jose.

The search may also include the associated resources of the group of users (e.g., as described in FIGS. 3-5). The associated resources may be assigned weights based on their relationship (e.g., proximity to) the selected resources of the users 602. When a search is performed, these associated resources may also be included in the search results based on the weights and the relevance of the associated resources.

An Exemplary Computer System

Figure 8:
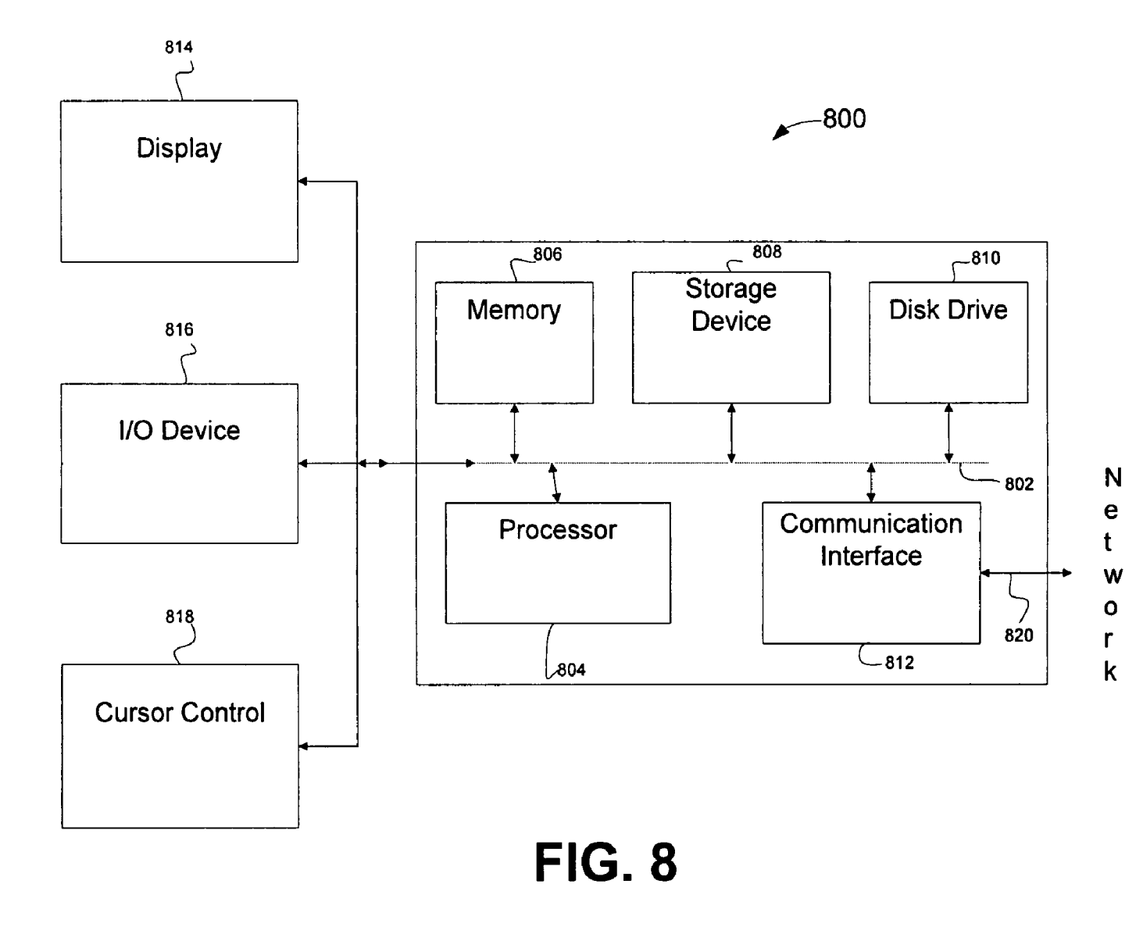
FIG. 8 is a block diagram illustrating an exemplary computer system suitable for searching a database of selected and associated resources, in accordance with various examples.

FIG. 8 is a block diagram illustrating an exemplary computer system suitable for searching a database of selected and associated resources, in accordance with various examples. In some examples, a computer system 800 may be used to implement computer programs, applications, methods, processes, or other software to perform the above-described techniques. The computer system 800 includes a bus 802 or other communication mechanism for communicating information, which interconnects subsystems and devices, such as a processor 804, a system memory 806 (e.g., RAM), a storage device 808 (e.g., ROM), a disk drive 810 (e.g., magnetic or optical), a communication interface 812 (e.g., modem or Ethernet card), a display 814 (e.g., CRT or LCD), an input device 816 (e.g., keyboard), and a cursor control 818 (e.g., mouse or trackball).

According to some examples, the computer system 800 performs specific operations by processor 804 executing one or more sequences of one or more instructions stored in the system memory 806. Such instructions may be read into the system memory 806 from another computer readable medium, such as the static storage device 808 or the disk drive 810. In some examples, hard-wired circuitry may be used in place of or in combination with software instructions to implement various examples.

Although the foregoing examples have been described in some detail for purposes of clarity of understanding, the examples are not limited to the details provided. There are many alternative ways of implementing the examples. The disclosed examples are illustrative and not restrictive.

What is claimed is:

1. A computer-implemented method, comprising:
a computer system receiving a search query;
in response to said receiving the search query, the computer system performing a search of selected resources previously selected by a specified user or specified group of users and associated resources that are linked to or mentioned in one of the selected resources or located within a directory path of one of the selected resources; wherein said performing a search comprises:
determining search results based on the search query, wherein said determining search results comprises:
determining a relevance score for each of one or more selected resources and each of one or more associated resources, wherein the relevance score for each of the one or more selected resources and associated resources is determined dependent on relevance of the resource to the search query; and
weighting the relevance score for each of the associated resources based on a relationship of the associated resource to one of the selected resources; wherein for at least one of the associated resources said weighting comprises weighting that associated resource's relevance score based on a quantity of path segments separating that associate resource and one of the selected resources; and the computer system providing search results including at least one selected resource and at least one of said associated resources in response to the search query, wherein the search results are ordered based on the relevance scores for the selected resources and based on the weighted relevance scores for the associated resources.

2. The method of claim 1, further comprising adding data indicative of the content of each of the associated resources to a database including data indicative of the selected resources.

3. The method of claim 1, wherein one or more of the selected resource have been previously tagged to associate one or more keywords with each of the tagged resources, and wherein the relevance score is further dependent on the keywords.

4. The method of claim 1, further comprising, prior to receiving a search query, receiving a link to select a resource.

5. The method of claim 1, further comprising identifying one or more of the associated resources by searching a path including one of the selected resources.

6. The method of claim 1, further comprising, in response to said search query, searching resources selected by the specified group of users.

7. The method of claim 6, wherein the search query includes an indication of the group of users and wherein selected resources not selected by at least one of the group of users are not considered when searching.

8. The method of claim 7, wherein the indication of the group of users is designated using a tree structure.

9. A computer-implemented method, comprising:
a computer system receiving a search query, the search query comprising a request to search at least a portion of a database comprising a previously-generated stored representation of a search space specific to a specified user or specified group of users, the stored representation indicating that a plurality of selected resources previously selected by the specified user or specified group of users define said search space specific to the specified user or specified group of users;
the computer system evaluating the previously-generated stored representation to determine a relationship between the selected resources of said search space specific to the specified user or specified group of users and one or more associated resources not selected by the specified user or specified group of users; wherein each associated resources is linked to or mentioned in one of the selected resources or located within a directory path of one of the selected resources; and
in response to said receiving and said determining, the computer system returning search results comprising at least one of the selected resources and at least one of the one or more associated resources, and the computer system ordering the returned search results based on weighted relevance scores for one or more of the associated resources, wherein for at least one of the associated resources said weighting comprises generating that associated resource's weighted relevance score based on a quantity of path segments separating that associate resource and one of the selected resources.

10. The method of claim 9, further comprising adding data indicative of the content of one or more of the associated resources to the database.

11. A system, comprising:
a memory storing executable instructions;
a processor coupled to the memory, wherein the processor is configured to execute said instructions to:
receive a search query; and
in response to receiving the search query, perform a search of selected resources previously selected by a specified user or group of users and associated resources that are linked to or mentioned in one of the selected resources or located within a directory path of one of the selected resource; wherein to perform the search, the processor is further configured to execute the instructions to:
determine search results based on the search query, wherein to determine the search result, the processor is further configured to execute the instructions to:
determine a relevance score for each of one or more selected resources and each of one or more associated resources, wherein the relevance score for each of the one or more selected resources and associated resources is determined dependent on relevance of the resource to the search query; and
weight the relevance score for each of the associated resources based on a relationship of the associated resource to one of the selected resources; wherein the program instructions are configured to, for at least one of the associated resources, weight that associated resource's relevance score based on a quantity of path segments separating that associate resource and one of the selected resources; and
provide search results including at least one selected resource and at least one of said associated resources in response to the search query, wherein the search results are ordered based on the relevance scores for the selected resources and based on the weighted relevance scores for the associated resources.

12. The system of claim 11, wherein one or more of the selected resource have been previously tagged to associate one or more keywords with each of the tagged resources, and wherein the relevance score is further dependent on the keywords.

13. A computer readable medium storing computer instructions executable for:
receiving a search query; and
in response to said receiving the search query, performing a search of selected resources previously selected by a specified user or group of users and associated resources that are linked to or mentioned in one of the selected resources or located within a directory path of one of the selected resource; wherein said performing a search comprises:
determining search results based on the search query, wherein said determining search results comprises:
determining a relevance score for each of one or more selected resources and each of one or more associated resources, wherein the relevance score for each of the one or more selected resources and associated resources is determined dependent on relevance of the resource to the search query; and
weighting the relevance score for each of the associated resources based on a relationship of the associated resource to one of the selected resources; wherein the program instructions are configured to, for at least one of the associated resources, weight that associated resource's relevance score based on a quantity of path segments separating that associate resource and one of the selected resources; and
providing search results including at least one selected resource and at least one of said associated resources in response to the search query, wherein the search results are ordered based on the relevance scores for the selected resources and based on the weighted relevance scores for the associated resources.

14. The computer readable medium of claim 13, the computer instructions further executable for adding data indicative of the content of each of the associated resources to a database including data indicative of the selected resources.

15. The computer readable medium of claim 13, wherein one or more of the selected resource have been previously tagged to associate one or more keywords with each of the tagged resources, and wherein the relevance score is further dependent on the keywords.

* * * * *